Jan. 25, 1944.  C. O. BRUESTLE  2,339,762
CABLE PULL-OFF MECHANISM
Filed Nov. 3, 1942  4 Sheets-Sheet 1

INVENTOR.
CARL O. BRUESTLE
BY Darby & Darby
ATTORNEYS

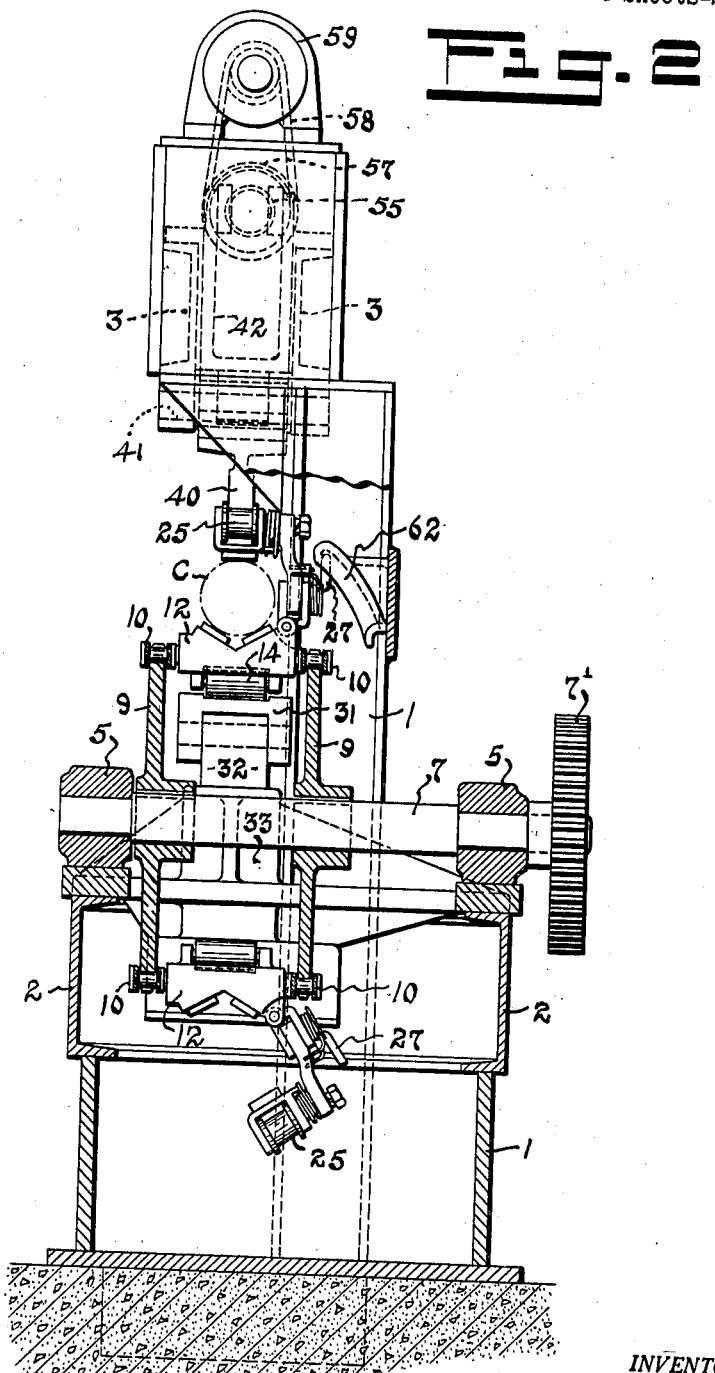

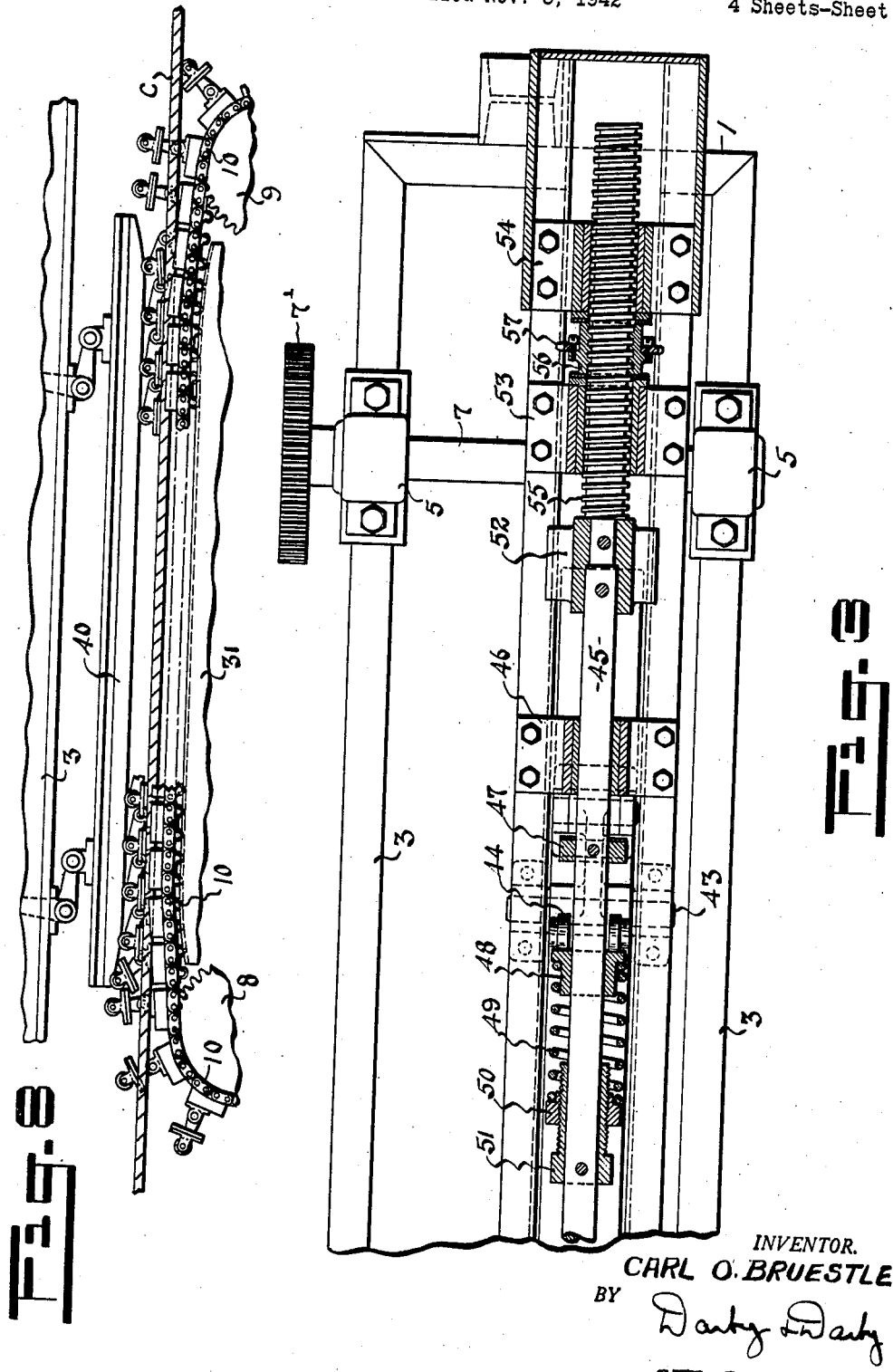

Jan. 25, 1944.   C. O. BRUESTLE   2,339,762
CABLE PULL-OFF MECHANISM
Filed Nov. 3, 1942   4 Sheets-Sheet 4
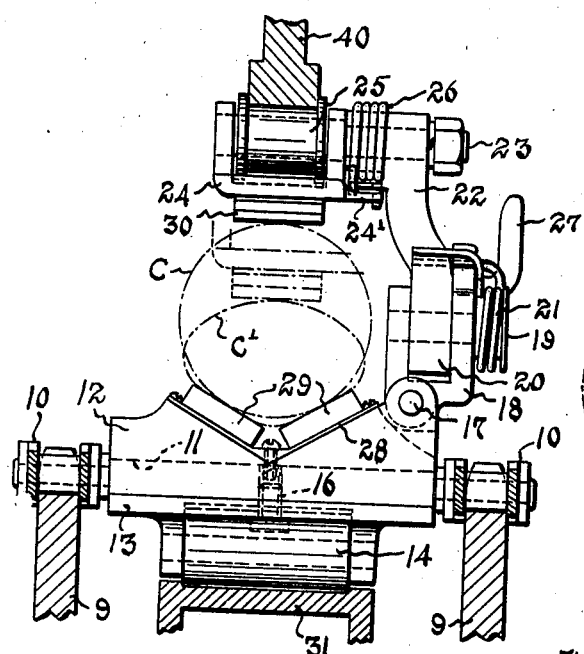
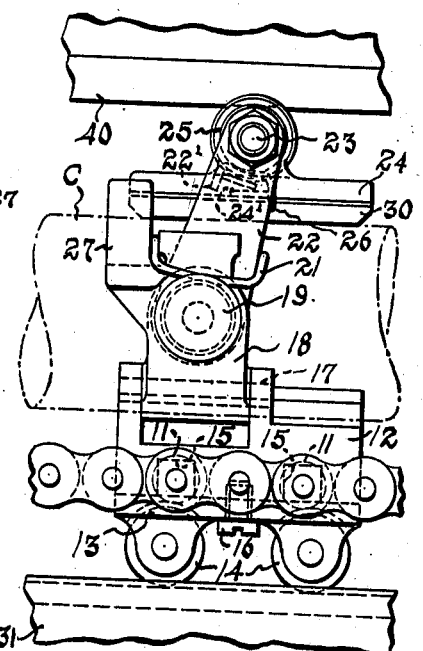
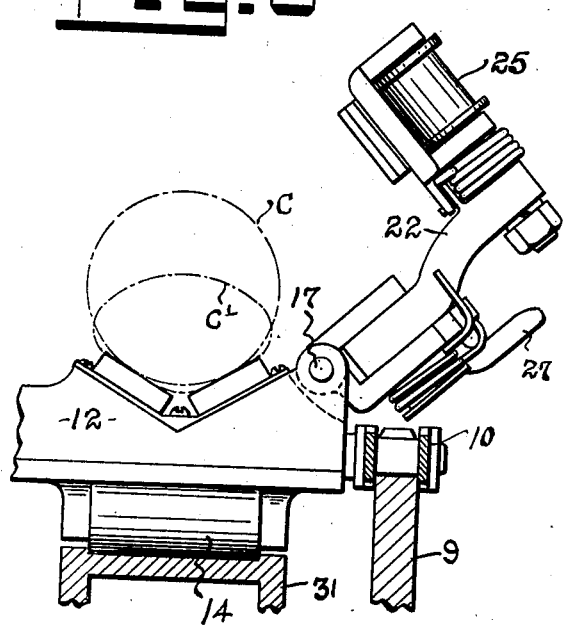
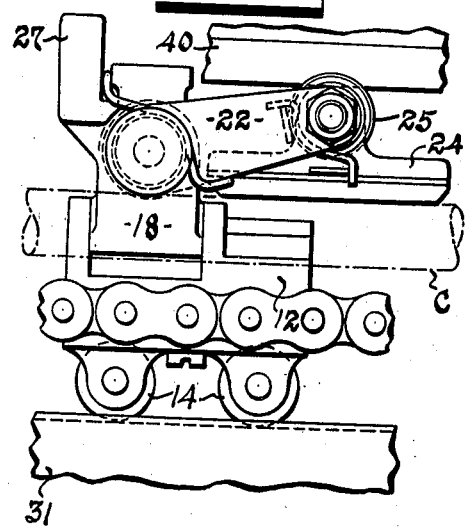
INVENTOR.
CARL O. BRUESTLE
BY
Darby & Darby
ATTORNEYS Patented Jan. 25, 1944

2,339,762

UNITED STATES PATENT OFFICE 2,339,762

CABLE PULL-OFF MECHANISM

Carl O. Bruestle, Rahway, N. J., assignor to Syncro Machine Company, Rahway, N. J., a corporation of New Jersey Application November 3, 1942, Serial No. 464,410

18 Claims. (Cl. 28—71.5)

This invention relates to power means for pulling cable and the like longitudinally of its length through and from any type of machine which in processing a cable requires such movement.

An object of this invention is to provide a relatively simple mechanism for engaging a cable such as an insulated electric conductor at a plurality of points so as to grip it without damage and exert a sufficient pull thereon while feeding it longitudinally to move it through and from various forms of processing machines.

Another object of this invention is to provide a machine employing an endless carrier on which is mounted a plurality of gripping devices in combination with means for engaging and disengaging the gripping devices for use in the movement of heavy electric conductors, cable and the like.

An important object of this invention is to provide a cable pulling mechanism which is not subject to the disadvantages due to the bending and return bending of the cable with subsequent shifting of the insulating strips as is the case in the use of the circular drum type pull-off capstan now frequently employed.

A further object of the invention is to provide, in a machine of this type, a mechanism whereby within the range of the machine a plurality of cable sizes may be readily accommodated as well as to compensate for irregularities in cable diameter and permit cable splices to pass without injury to the cable.

A still further object is to provide, in such a machine, means for resiliently applying the gripping power.

An additional object of the invention is to provide gripping devices constructed to provide a plurality of separated areas of contact about the periphery of the cable whether the cable be of circular cross-section or of segmental cross-section.

These and other more specific objects will be apparent from the following disclosure of the embodiment herein illustrated for the purpose of explaining the invention.

The subject matter of this application is related to my copending application Serial No. 464,409 filed November 3, 1942 and entitled "Cable pull off mechanism."

This invention resides substantially in the combination, construction, arrangement and relative location of parts, all as will be described in detail below.

In the accompanying drawings,

Figure 2 is a cross-sectional view taken on the line 2—2 of Figure 1;

Figure 3 is a cross-sectional view taken on the line 3—3 of Figure 1;

Figure 4 is a front elevational view of one of the gripping devices showing some of the associated parts in cross-section and showing the relative position of the upper half of the gripping device when applied to a cable of segmental cross-section;

Figure 5 is a side elevational view of the structure of Figure 4;

Figure 6 is a view similar to that of Figure 4 showing the gripping devices open and a portion thereof broken away;

Figure 7 is a view similar to Figure 5 showing the position of the parts when applied to a cable of smaller cross-section than that illustrated in Figure 5; and Figure 8 is a broken side elevational view illustrating the deformation of the chain or endless carrier for the gripping devices when operating on a cable of small size.

Figure 1:
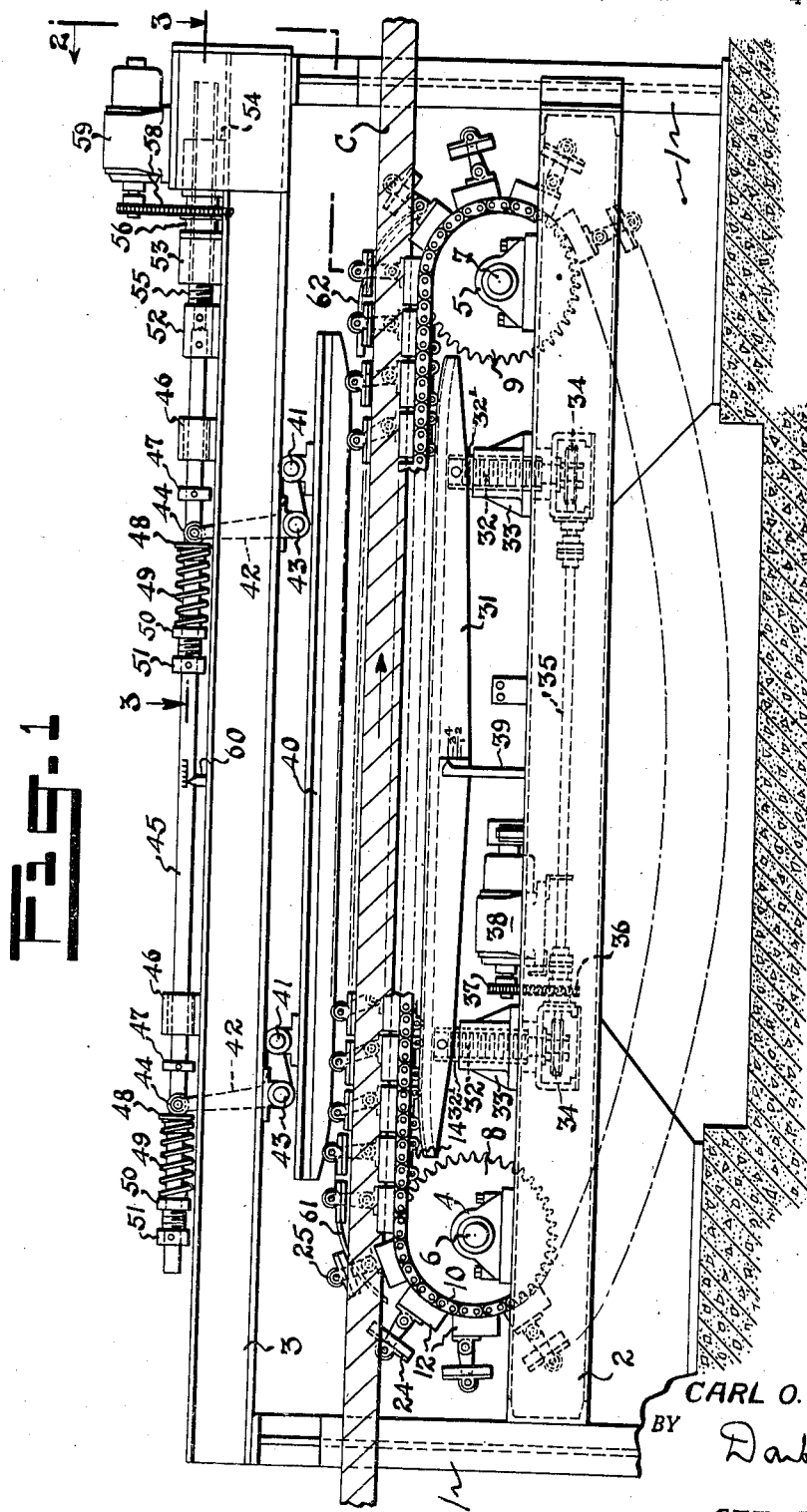
Figure 1 is a side elevational view of the embodiment of the invention herein to be described with some parts broken away and showing the foundation in cross-section.

In the manufacture and processing of electric cables and similar structures it is necessary to move the cable longitudinally of its length. For example, in applying multiple layers of wrapped insulation to electrical conductors it is necessary to pull or move the cable through the wrapping machine. In the larger cable sizes it takes a considerable force applied to the cable to effect its movement when wrapping it.

An important requirement of a power transmission device of this type is that it shall not injure or damage the cable, and in accordance with this invention a caterpillar endless chain arrangement is employed which applies the necessary pressure to a plurality of points or lines of contact throughout a substantial length of the cable so that the damaging pressure is not applied at any particular point. In addition, the machine of this invention is so devised that oil and grease needed in the lubrication thereof is not liable to contaminate the cable. Thus, in the illustrated mechanism most of the operating parts are situated below the path of movement of the cable, thereby minimizing the possibility of dirt and grease from the machine dropping on the cable.

Other advantages of this machine will be understood from the following description.

As illustrated, the machine includes a pair of end standards or supports 1 connected by longitudinal lower and upper beams 2 and 3 with suitable cross bracing to provide a rigid framework. Mounted upon the lower beams 2 are the pair of bearing blocks 4 and 5 in which are respectively journaled the transverse sprocket shafts 6 and 7. A pair of spaced sprocket wheels 8 are secured to the shaft 6 between the bearing brackets 4, and similarly a pair of sprocket wheels 9 are secured in spaced relation to the shaft 7. A pair of endless chains 10 pass around the sprocket pairs 8 and 9 and are cross-connected by rods 11 as best indicated in Figure 4. These rods are longitudinally spaced so as to receive a plurality of gripping devices extending throughout the length of the carrier formed by the chains 10 and the rods 11. Each gripping device includes a base 12 which has a pair of transverse rectangular grooves 15 extending from side to side in which the shafts 11 lie. In other words, each gripping device fits over a pair of shafts 11, as shown in Figure 5, and a base plate 13 is secured across the bottom of the bases 12 by means of a screw 16 so as to attach the gripping devices to the chain carrier. The purpose of this construction may well be noted at this moment by referring to Figure 1, where it will be seen that the gripping devices on the lower cross of the carrier may be readily removed for repair and replacement by taking the screw 16 out, whereupon the device may be removed from the carrier. The base plates 13 are provided with depending ears on which are journaled rollers 14.

Pivotally mounted at one side of each base 12 on the pivot pin 17 is a U-shaped bracket 18 upon which is mounted a pivot pin 19 extending transversely of the pivot pin 17. Pivotally mounted on the pivot pin 19 is a hub 20 integral with an arm 22. Secured on the free end of the arm 22 is a pivot shaft 23 extending parallel to the pivot shaft 19, upon which is mounted a gripping plate 24 by means of a pair of upstanding arms as is clear from Figure 4. Rotatably mounted on the stud shaft 23 between these arms is a roller 25. A spring 21 encircles the head of the pivot pin 19 and has its respective ends engaging a rigid part of the yoke 18 and the arm 22, as is clear from Figure 5, so as to hold the arm 22 vertical when it is free, which is to say when it is not forced into some other position. Likewise a spring 26 encircles the stud shaft 23 and has its respective ends engaging the plate 24 and the arm 22 so as to hold the plate 24 at right angles to the arm 22 when unrestrained. The position of these parts is illustrated at the right and left hand ends of Figure 1, where they are shown free of any restraint. The plate 24 has a projecting finger 24' which engages a stop 22' on the arm 22 so that the spring 26 may only move the plate 24 to its right angled position. The yoke 18 has an extending arm 27, the purpose of which will be described later. The base 12, as shown in Figure 4, is shaped to provide a relatively flat V formation upon which a support 28 for the friction pads 29 may be secured. The friction pads 29 may be of any suitable resilient material, as for example rubber of the proper rigidity and flexibility. The faces of these pads lie at about an angle of 120 degrees. Similarly, there is secured to the bottom face of the plate 24 a gripping or facing member 30 likewise of rubber or the like.

Returning to Figure 1, it will be seen that there is a pressure and camming rail 31 disposed under the upper flight of the chain carrier and centrally thereof, as is clear from Figure 4, so as to be engaged by the rollers 14 on the gripping devices. The ends of the rail are curved downwardly so as to gradually guide the gripping devices up into the plane of adjustment of the rail. The rail 31 is supported by and attached at its ends to a pair of heavy vertical internally threaded sleeves 32' which threadedly engage shafts 32. Mounted on the framework are standards 33 in which the sleeves 32' may slide but not turn. The lower ends of the shafts 32 project below and are provided with worm wheels 34 which mesh with worms, not shown, mounted on the ends of a shaft 35. Secured to the shaft 35 is a sprocket wheel 36 which is connected by a chain 37 to a drive sprocket on the shaft of the drive motor 38. As shown shafts 32 can turn but may not move longitudinally. A fixed pointer 39 mounted on the frame is positioned to cooperate with a scale marked on the rail 31 as shown.

Positioned upon the carrier is an upper rail 40, likewise located at the transverse center of the carrier, as is clear from Figure 4, for engaging the rollers 25 on the top of the gripping devices. The camming face of the rail 40 has curved ends, as shown, to likewise guide the upper parts of the gripping devices downwardly into the plane of adjustment.

Near the ends of the rail 40 are brackets in which are mounted pivot pins 41 for pivotally supporting the ends of the bell crank levers 42, which are in turn pivotally supported at 43 on the frame. The upper ends 44 of the free arms of the bell crank levers 42 are bifurcated so as to fit around the ends of the shaft 45, as is clear from Figure 3. The shaft 45 is journaled in bearings 46 mounted on the framework, and is provided with adjustable positionable collars 47. Slidably mounted on the shafts are sleeves 48 which engage the ends 44 of the bell crank levers and form a seat for one end of each of the springs 49. The details of this structure are best seen in Figure 3, from which it appears that the other ends of the springs 49 engage threaded collars 50 mounted on the threaded sleeves 51 secured to the shaft 45. By adjusting the sleeves 51 it will be seen that the basic pressure which the springs 49 exert on the bell crank levers may be adjusted as required.

The right hand end of shaft 45 is coupled by means of a coupling member 52 which may slide on the framework to a heavy threaded shaft 55 which may slide through guide bearings 53 and 54. Mounted between these guide bearings is a threaded nut 56 which engages the threads on the shaft 55. Secured to this nut is a sprocket wheel 57 which is connected by means of a chain belt 58 to a drive sprocket on the motor 59. As shown in Figure 1, a pointer 60 mounted on the framework cooperates with a scale attached to the shaft 45. Near the left hand end of the machine is a guiding cam 61 for cooperation with the arms 27 of the gripping devices as will be explained later. At the other end of the machine is a cam 62 for similar cooperation, the function of which will be described later.

In the operation of this machine, in order to place the starting end of the cable in the machine, shaft 45 is shifted the full distance to the left by energizing motor 59 to cause nut 56 to revolve. This nut being unable to shift longitudinally causes the shaft 45 to slide without turning in the guides 46. Near the end of the stroke of this shaft, towards the left, the collars 47 when properly positioned on the shaft engage the upper ends 44 of the bell crank levers 42, causing them to raise the upper rail 40 the full distance which is high enough so that the arms 22 and the gripping devices under it may be flipped back out of the way. The cable is then laid in on the lower portions of the gripping devices so as to rest on the plates 29. The upper parts of the gripping devices are then flipped back into position so that the upper gripping plates 30 engage the top of the cable. Motor 59 is now energized in a reverse direction to cause shaft 45 to shift back to the right allowing the rail 40 to descend until it rests on the rollers 25. Further shifting of the shaft 45 to the right will ultimately cause the sleeves 48 to engage the upper ends of the bell crank levers 42, after which springs 49 are compressed and shaft 45 is properly positioned to cause the upper rail to create the necessary gripping pressure on the gripping devices. The machine may then be set in operation, assuming the lower rail 31 is, of course, in the proper position for the particular size of cable being processed. As the sprockets 8 and 9 revolve the chain carrier travels on the top flight from left to right, so that as the gripping devices swing up around the left hand end of the machine into the range of cam 61, they are caused to swing back over the cable about the pivot 17 (Figure 4). At the same time the rollers 25 engaging the rail 40 are caused to pivot about the pivot pins 19 to take an inclined position against resistance of the springs 21, as illustrated in Figure 1, depending upon the position of the rails. At the same time the upper pads 30 may engage the top surface of the cable C throughout their length by pivoting on the stud shafts 23 against the resistance of the respective springs 26. Thus the cable is gradually compressed between the three contact plates 29 and 30 under pressure, depending upon the relative position of the rails 31 and 40. At the start a sufficient length of the cable C can be free so that no major pull is required on the cable until its end passes out of the right hand end of the machine, so that it is gripped throughout a maximum length. As the gripping devices move into the range of the cam 62 (see Figure 2) the ends of the arms 27 engage with the camming surface of the cams 62 to swing the arms 22 about the pivot 17 out from the position shown in Figure 4 to the position shown in Figure 6. Thus the gripping devices are moved from over the cable at the exit end so as to permit it to travel onto a reeling device or the like without interference with these gripping devices.

It is likewise apparent that at the entering end of the machine the cable may move into position without interference with the gripping devices. As the gripping devices move away from the ends of the rails at the exit side of the machine the pressure thereon is released and the arms 22 can move to upright position and the plates 24 back to right angle relation with the arms, which is the normal unrestrained position of these parts. The gripping devices then travel back along the lower flight of the carrier to the entering end of the machine to repeat their operations.

In order to adjust the machine for either cable sizes the motors 38 and 59 are energized through suitable control mechanism, not shown. The lower rail 31 is raised and lowered by operating the motor 38 either forwardly or in reverse. When the motor operates shaft 35 is caused to revolve and through the worms drive a worm wheel 34 to cause the shafts 32 to revolve. These shafts being threaded in the sleeves 32' they move the sleeves 32' vertically in either direction, without turning, to position the lower rail 31 in the proper plane, depending upon the cable size. If desired the same structure used for this purpose in my copending disclosure referred to above may be used in place of the form here disclosed. The pointer 39 and its scale serve to indicate the proper position of the lower rail for various cable sizes. Likewise, the upper rail 40 may be moved vertically by energizing motor 59 to rotate the nut 56 in the direction as required. Nut 56 is constrained against endwise movement between the guide blocks 53 and 54 so that as it rotates shaft 45 is moved longitudinally either to the right or to the left. This movement of the shaft through the agency of the springs 49 causes upper rail 40 to take a position such as when the cable is fed into the machine. The rail 40 may rise against the resistance of the springs 49 to apply the proper pressure to the cable. The initial adjustment of the springs 49 can be accomplished by rotating the collars 50. The pointer 60 and the cooperating scale also provide means for properly positioning the upper rail for a particular cable size.

From this description it will be seen how pressure may be increased or relieved to effect movement of the cable C without injury to it and without slippage. Thus the rails 31 and 40 may be roughly adjusted to control this pressure, and more finely adjusted by the collars 50, if necessary. In the handling of smaller cable sizes the arms 22 will be inclined more abruptly than in the case of Figure 1, as indicated in Figure 7 and as emphasized by comparison with Figure 5. This further inclination of the arms 22 causes a complementary pivoting of the plates 24, as is clearly indicated in Figure 7. Likewise, in the case of small cable sizes, the upper flight of the chain may be deflected upwardly out of a path tangent to the sprockets 8 and 9 by means of the lower rail 31 as illustrated in Figure 8. Thus, within the range of cable sizes for a particular machine, it may be quickly adjusted to handle any cable or the like within that range.

Special reference is made to Figure 4 to indicate the multiple points or lines of contact between the cable and each gripping device. It is by reason of this relative positioning of gripping pads or plates 29 and 30 in conjunction with the adjusting mechanism described above, that it is possible to handle a wide range of cable sizes.

Another important advantage of this arrangement of the parts is illustrated in Figures 4 and 6. This machine as constructed is adapted to handle cables C' of segmental cross-section. In the manufacture of large size power cables it is now a practice to form the large cable which is of circular cross-section from three smaller cables of segmental cross-section having flat faces lying at an angle of 120 degrees, so that three of these segmental sections may be assembled into a single large cable of circular cross-section and then bound together into a permanent structure. It has been extremely difficult in the past to manufacture these segmental conductors which are in themselves fairly large, because of the difficulty of properly applying power to them for movement during processing without damage thereto. As illustrated in Figure 4, the machine of this invention may be employed as a pull-off device for cables of this type, as diagrammatically illustrated in Figure 4.

From the above description it will be apparent to those skilled in the art that the principles and subject matter of this invention may be embodied in other physical forms, and I do not, therefore, expect to be limited to the disclosure given herein to illustrate those principles and that subject matter, but rather prefer limitation as required only by the appended claims.

What is claimed is:

1. In a machine for moving a cable or the like in the direction of its length including in combination a framework, an endless carriage supported for movement along a path below the path of said cable, a plurality of gripping devices mounted on said carrier having cable contact members lying on the sides of a triangle, and means positioned above and below the path of the cable for engaging said gripping devices to force them to engage a cable under pressure.

2. In a machine for moving a cable or the like in the direction of its length including in combination a framework, an endless carriage supported for movement along a path below the path of said cable, a plurality of gripping devices mounted on said carrier having cable contact members lying on the sides of a triangle, and means positioned above and below the path of the cable for engaging said gripping devices to force them to engage a cable under pressure, each of the gripping devices comprising a support secured to the carrier and a cooperating member pivotally mounted thereon.

3. In a machine for moving a cable or the like in the direction of its length, the combination including a framework, an endless carrier movably supported on said framework below the path of movement of the cable, a plurality of gripping devices each comprising a support secured to said carrier and a gripping member pivotally mounted on the support for swinging movement on an axis parallel to the cable path, means adjacent the entering end and adjacent the exit end of the machine for moving said swinging members into and out of engagement with a cable, and means engaging the gripping devices from above and below for forcing them into contact with the cable.

4. In a machine for moving a cable or the like in the direction of its length, the combination including a framework, an endless carrier movably supported on said framework below the path of movement of the cable, a plurality of gripping devices each comprising a support secured to said carrier and a gripping member pivotally mounted on the support for swinging movement on an axis parallel to the cable path, means adjacent the entering end and adjacent the exit end of the machine for moving said swinging members into and out of engagement with a cable, and means engaging the gripping devices from above and below for forcing them into contact with the cable, the support and swinging member of each gripping device having contact members lying on the sides of an imaginary triangle.

5. In a machine for moving a cable or the like in the direction of its length, the combination including a framework, an endless carrier movably supported on said framework below the path of movement of the cable, a plurality of gripping devices each comprising a support secured to said carrier and a gripping member pivotally mounted on the support for swinging movement on an axis parallel to the cable path, means adjacent the entering end and adjacent the exit end of the machine for moving said swinging members into and out of engagement with a cable, means engaging the gripping devices from above and below for forcing them into contact with the cable, and means for adjustably positioning said last means to vary the pressure of the gripping devices on a cable.

6. In a machine for moving a cable or the like along a straight line in the direction of its length, comprising in combination a supporting framework, an endless carrier mounted on said framework for movement along a path parallel to the lower side of the path of the cable, a plurality of gripping devices mounted on said carrier each comprising a support secured to the carrier having at least two cable engaging members, and a third cable engaging member pivotally mounted on axes at right angles to the cable path, means for engaging said gripping devices from below and above to force them into contact with the cable, and means for moving said carrier.

7. In a machine for moving a cable or the like along a straight line in the direction of its length, comprising in combination a supporting framework, an endless carrier mounted on said framework for movement along a path parallel to the lower side of the path of the cable, a plurality of gripping devices mounted on said carrier each comprising a support secured to the carrier having at least two cable engaging members, and a third cable engaging member pivotally mounted on axes at right angles to the cable path, means for engaging said gripping devices from below and above to force them into contact with the cable, and means for moving said carrier, said gripping devices engaging means being adjustable towards and away from the cable to adjust the machine for handling cables of different sizes.

8. In a machine for moving a cable or the like in a straight line in the direction of its length, comprising a supported framework, an endless flexible carrier mounted for movement along a path below and parallel to the path of the cable, a plurality of gripping devices mounted on said carrier each comprising a support secured to the carrier having two contact plates lying at an angle to each other, and an upper gripping plate adapted to engage the cable from above and secured to the supporting member by an arm pivotally mounted thereon for movement on axes parallel to and at right angles to the cable, and means positioned above and below the cable path for engaging the gripping devices to move them into contact with the cable under a desired pressure.

9. In a machine for moving a cable or the like in a straight line in the direction of its length, comprising a supported framework, an endless flexible carrier mounted for movement along a path below and parallel to the path of the cable, a plurality of gripping devices mounted on said carrier each comprising a support secured to the carrier having two contact plates lying at an angle to each other, and an upper gripping plate adapted to engage the cable from above and secured to the supporting member by an arm pivotally mounted thereon for movement on axes parallel to and at right angles to the cable, means positioned above and below the cable path for engaging the gripping devices to move them into contact with the cable under a desired pressure, and means to vary the position of said last means transversely of the cable path.

10. In a machine for moving a cable or the like in a straight line in the direction of its length, comprising a supported framework, an endless flexible carrier mounted for movement along a path below and parallel to the path of the cable, a plurality of gripping devices mounted on said carrier each comprising a support secured to the carrier having two contact plates lying at an angle to each other, and an upper gripping plate adapted to engage the cable from above and secured to the supporting member by an arm pivotally mounted thereon for movement on axes parallel to and at right angles to the cable, means positioned above and below the cable path for engaging the gripping devices to move them into contact with the cable under a desired pressure, means to vary the position of said last means transversely of the cable path, and means at the entering and exit ends of the machine for swinging said upper engaging plate into a position over the cable at the entering end of the machine and to a course from over the cable at the exit end of the machine as the carrier moves to engage and disengage the cable.

11. In a machine for moving a cable or the like in a straight line in the direction of its length, comprising a supported framework, an endless flexible carrier mounted for movement along a path below and parallel to the path of the cable, a plurality of gripping devices mounted on said carrier each comprising a support secured to the carrier having two contact plates lying at an angle to each other and an upper gripping plate adapted to engage the cable from above and secured to the supporting member by an arm pivotally mounted thereon for movement on axes parallel to and at right angles to the cable, means positioned above and below the cable path for engaging the gripping devices to move them into contact with the cable under a desired pressure, means to vary the position of said last means transversely of the cable path, means at the entering and exit ends of the machine for swinging said upper engaging plate into a position over the cable at the entering end of the machine and to a course from over the cable at the exit end of the machine as the carrier moves to engage and disengage the cable, and means for positioning said means for engaging the gripping devices transversely of the cable to adapt the machine for the handling of different cable sizes.

12. In a machine for exerting a pull on a cable or the like to move it along a straight line in the direction of its length including a framework, an endless carrier having gripping devices mounted thereon for engaging a cable from below and above, and means cooperating with the gripping devices to force them into gripping relation with the cable.

13. In a machine for exerting a pull on a cable or the like to move it along a straight line in the direction of its length including a framework, an endless carrier having gripping devices mounted thereon for engaging a cable from below and above, means cooperating with the gripping devices to force them into gripping relation with the cable, and spring compression means for engaging said gripping devices to cause them to grip the cable under a yielding pressure.

14. In a machine for pulling a cable or the like along a defined path in the direction of its length, the combination including a supporting framework, means including a plurality of gripping devices for engaging the cable at a plurality of points from above and below, each gripping device comprising a relatively fixed part and another part swingable to one side of the cable, means for swinging said other part into and out of engagement with the cable, and means for engaging the gripping devices for causing them to grip the cable along a limited portion of its path of movement.

15. In a machine for pulling cable, the combination including a framework, an endless carrier movably mounted on said framework, a plurality of gripping devices secured to said carrier and each comprising a cable contacting member fixed to the carrier and a movable arm pivotally mounted thereon, each of said arms having a cable contacting member pivotally mounted on it and means positioned to be engaged by said gripping devices as the carrier moves for forcing them into cable gripping relation, the cable contact members on said arms pivoting to tangential position with respect to cables of different sizes.

16. In the combination of claim 15, said last means including mechanism for positioning them towards and away from said carriers to adjust them for different cable sizes.

17. In the combination of claim 15, said last means including mechanism for positioning them towards and away from said carriers to adjust them for different cable sizes and including resilient connections to produce a yielding pressure of the gripping devices on the cables.

18. In a machine for pulling cable, the combination including a framework, an endless carrier movably mounted on said framework, a plurality of gripping devices secured to said carrier and each comprising a cable contacting member fixed to the carrier and a movable arm pivotally mounted thereon, each of said arms having a cable contacting member pivotally mounted on it, means positioned to be engaged by said gripping devices as the carrier moves for forcing them into cable gripping relation, the cable contact members on said arms pivoting to tangential position with respect to cables of different sizes, and springs for normally holding said cable contacting members at right angles to their respective supporting arms.

CARL O. BRUESTLE.